(12) United States Patent
Sakuma et al.

(10) Patent No.: US 9,028,904 B2
(45) Date of Patent: May 12, 2015

(54) METHOD OF PREPARING SOYBEAN MIXED POWDER, METHOD OF PREPARING A SOLIDIFIED SOYBEAN FOOD, AND A METHOD OF PREPARING A PACKAGED RAW MATERIAL FOR PREPARING A SOLIDIFIED SOYBEAN FOOD

(75) Inventors: Atsushi Sakuma, Higashi-Osaka (JP); Toshiya Minami, Higashi-Osaka (JP); Masaki Nakamura, Higashi-Osaka (JP)

(73) Assignee: House Foods Corporation, Osaka (JP)

( * ) Notice: Subject to any disclaimer, the term of this patent is extended or adjusted under 35 U.S.C. 154(b) by 0 days.

(21) Appl. No.: 13/303,654

(22) Filed: Nov. 23, 2011

(65) Prior Publication Data
US 2012/0124946 A1 May 24, 2012

Related U.S. Application Data

(63) Continuation of application No. 12/524,840, filed as application No. PCT/JP2008/051675 on Feb. 1, 2008, now abandoned.

(30) Foreign Application Priority Data

Feb. 1, 2007 (JP) ................................. 2007-022605

(51) Int. Cl.
*A23C 11/10* (2006.01)
*A23C 20/02* (2006.01)
*A23L 1/00* (2006.01)
*A23L 1/09* (2006.01)
*A23L 1/20* (2006.01)

(52) U.S. Cl.
CPC .............. *A23C 11/103* (2013.01); *A23C 20/025* (2013.01); *A23L 1/0035* (2013.01); *A23L 1/09* (2013.01); *A23L 1/2006* (2013.01)

(58) Field of Classification Search
CPC .. A23C 11/103; A23C 20/025; A23L 1/0035; A23L 1/09; A23L 1/2006; A23L 1/20; A23L 1/2003; B65B 3/04
USPC ......................................................... 426/634
See application file for complete search history.

(56) References Cited

U.S. PATENT DOCUMENTS 4,830,871 A * 5/1989 Takenawa et al. ............ 426/634
2001/0026831 A1* 10/2001 Iwamoto ....................... 426/598
(Continued)

FOREIGN PATENT DOCUMENTS

| CN | 1408276 A | 4/2003 |
|---|---|---|
| CN | 1551730 A | 12/2004 |
| CN | 1623435 A | 6/2005 |

(Continued)

OTHER PUBLICATIONS

JP 58071855 A, Kudo et al. Apr. 1983, English Abstract Translation.*
(Continued)

*Primary Examiner* — Michele L Jacobson
*Assistant Examiner* — Hong T Yoo
(74) *Attorney, Agent, or Firm* — Marshall, Gerstein & Borun LLP (57) ABSTRACT

A method of preparing soybean mixed powder comprising a soybean powder having properties wherein formation of agglomerate is small when the powder is added to water and then heated with stirring to dissolve the powder.

11 Claims, 1 Drawing Sheet

(56) References Cited

U.S. PATENT DOCUMENTS

2005/0271709 A1   12/2005   Dazliel et al.
2006/0188637 A1   8/2006    Iwamoto

FOREIGN PATENT DOCUMENTS

| | | | |
|---|---|---|---|
| CN | 1685962 A | | 10/2005 |
| CN | 1688342 A | | 10/2005 |
| JP | 49-25149 | | 3/1974 |
| JP | 4925149 | | 3/1974 |
| JP | 50-145541 A | | 11/1975 |
| JP | 54-86648 A | | 7/1979 |
| JP | 5486648 | | 7/1979 |
| JP | 58071855 A | * | 4/1983 |
| JP | 59-28448 A | | 2/1984 |
| JP | 6-133714 | | 5/1994 |
| JP | 09234010 A | | 9/1997 |
| JP | 09327273 A | * | 12/1997 |
| JP | 10084901 A | | 4/1998 |
| JP | 11346699 A | | 12/1999 |
| JP | 2002218934 A | | 8/2002 |
| JP | 2003189811 A | | 7/2003 |
| JP | 2005-151945 A | | 6/2005 |
| JP | 2006504411 | | 2/2006 |
| JP | 2006-212005 A | | 8/2006 |
| JP | 2006-246850 A | | 9/2006 |
| KR | 10-2006-0007426 | | 1/2006 |
| KR | 10-0651991 | | 11/2006 |
| KR | 10-2007-0007745 | | 1/2007 |
| WO | WO-03022069 | | 3/2003 |
| WO | WO-2006/109991 A1 | | 10/2006 |

OTHER PUBLICATIONS

JP 09327273 A, Usami, Dec. 1997, English Abstract Translation.*
International Search Report and Written Opinion for PCT/JP2008/051675 dated Apr. 22, 2008.
Australian Office Action for Application No. 2008211977, dated Jun. 23, 2010.
Extended European Search Report for Application No. 08710707.4, dated May 23, 2011.
Official action for Japanese Application No. 2008-556203, dated Jul. 5, 2012. (Excerpt only).

* cited by examiner

METHOD OF PREPARING SOYBEAN MIXED POWDER, METHOD OF PREPARING A SOLIDIFIED SOYBEAN FOOD, AND A METHOD OF PREPARING A PACKAGED RAW MATERIAL FOR PREPARING A SOLIDIFIED SOYBEAN FOOD

CROSS-REFERENCE TO RELATED APPLICATIONS

This is a continuation of U.S. application Ser. No. 12/524,840 filed Jul. 28, 2009, which is the U.S. national phase of PCT/JP2008/051675 filed Feb. 1, 2008, which claims the priority benefit under USC 119 of JP 2007 022605 filed Feb. 1, 2007, the entire respective disclosures of which are incorporated herein by reference.

TECHNICAL FIELD

The present invention relates to a soybean mixed powder product and a premix (or raw material) for preparing a solidified soybean food, which permit the easy preparation of, for instance, a soybean-derived beverage, TOFU or TOFA (also referred to as "TOFU-FA") at each individual home and the like.

BACKGROUND ART

There has been known, for a long time, a premix or a raw material for use in the preparation of TOFU at each home and some of them will be introduced herein. For instance, an example thereof is a method for preparing TOFU capable of easily released from a container for coagulation, which comprising the steps of adding water to powdered soybean milk, then heating the resulting mixture, adding a coagulating agent thereto and packaging the mixture in a container to thus solidify the same and to thereby form TOFU (see Patent Document 1 specified below). This Patent Document likewise discloses that a surfactant having an HLB value of not less than 11 is useful for the improvement of the releasability of the resulting TOFU from the container and it discloses sucrose fatty acid esters as specific examples of the surfactants.

In addition, there have also been known such disclosure as to a raw composition for preparing TOFU, which is quite excellent in the solubility and dispersibility in hot water and which permits the preparation of TOFU having stable quality according to a simple method and a method for preparing the raw composition, as well as a simple method for preparing TOFU which makes use of the raw composition for preparing TOFU (see Patent Document 2 specified below).

Moreover, there has been disclosed a raw material for preparing TOFU characterized by combining packaged TOFU which comprises a predetermined amount of sterilized soybean milk air-tightly packed in a container and a packed coagulating agent in an amount corresponding to that of the packaged TOFU and there has also been included a description concerning the preparation of, in addition to the liquid soybean milk, powdered soybean milk according to, for instance, a method comprising the steps of spray-drying, freeze-drying and/or vacuum drying such soybean milk (see Patent Document 3 specified below).

There has also been disclosed a TOFU set for the hand-fabrication thereof, which comprises separately packaging soybean milk as a raw material for forming TOFU, and a coagulating agent for solidifying the soybean milk in an amount sufficient for solidifying the same and accommodating these separate packages in the same box so that they can simultaneously be distributed (see Patent Document 4 specified below).

However, the liquid soybean milk is very liable to cause taste change during storing the same and the storage stability thereof is thus considerably reduced. Contrary to this, in case of the liquid soybean milk, which has been subjected to cruel heating and sterilization treatments during its production step for the improvement of the storage stability thereof, the protein components present therein may undergo denaturation and this in turn results in the considerable reduction of the ability of forming TOFU through coagulation. Moreover, in case of powdered TOFU, the storability thereof is improved, but the protein components thereof may undergo denaturation through the heat-treatment of soybean milk depending on the spray-drying conditions and this may result in the reduction of the ability of coagulating into TOFU. Furthermore, in case of the powdered soybean milk prepared by the freeze-drying technique, a problem arises such that the formation of such powder requires great expense.

Then there has already been known a raw material comprising powdery soybean used for preparing TOFU in each home and accordingly, some techniques for preparing the same will be herein introduced.

First of all, there has been disclosed soybean milk, or soybean powder used for preparing TOFU, which is a pulverized product of dried whole soybeans, has a 50% cumulative particle size starting from the minimum particle size (median particle size) of not more than 40 μm and a water content of not less than 5.2% as determined in terms of the weight loss observed when heating at 90° C. for 1.5 hours (see Patent Document 5 specified below).

In case of this technique, when preparing soybean milk or TOFU in each home using the foregoing pulverized product of dried whole soybeans, it is necessary to blend the pulverized product of soybeans with water and then heated, but the foregoing pulverized product of dried whole soybeans is liable to cause integration or agglomeration and to thus form agglomerates when blending it with water and heating, this sometimes leads to insufficient and non-uniform distribution of the pulverized product in hot water and a part thereof remains undissolved. As a result, the soybean milk or TOFU ultimately obtained often has unacceptable or bad appearance and is rough and unpleasant to the teeth, because of the presence of such pulverized product of the dried whole soybeans remaining therein undissolved condition.

Furthermore, there has been described a good formed into a set which is obtained by heat-treating, with stirring, soybean finely pulverized into powder having a classified average particle size of not greater than 50 μm while blowing high temperature water vapor into the same, packing up the resulting mixture and separately packing a coagulating agent, in which the mixture is blended with the coagulating agent, for instance, at each home to thus coagulate the same and to thus form TOFU of whole soybean (see Patent Document 6 specified below).

According to this method, however, the good in the form of a set is liable to undergo taste and texture changes during storage or the storage stability of the good is considerably reduced since the good includes a mixed liquid containing finely pulverized soybean powder and water. Contrary to this, such a good, which has been subjected to cruel heating and sterilization treatments during its production step for the improvement of the storage stability thereof, an additional problem may arise such that the protein components present therein may undergo denaturation and that the ability of forming TOFU through coagulation is thus considerably impaired or reduced.

Moreover, as an example of the technique for improving the dispersibility of soybean powder in water while making use of dextrin, there has been disclosed a method comprising the steps of spraying soybean protein powder with dextrin having a DE value ranging from 10 to 25 to thus give a powdery soybean protein-containing material which has an excellent solubility in water even when the material combined with water is weakly stirred, while maintaining a sufficient gel-forming ability (see Patent Document 7 specified below).

However, this method requires the steps for dissolving dextrin in water, and spraying the soybean protein powder with a shaping liquid (a binder solution) and this makes the production process quite complicated since the method requires the use of an apparatus, for instance, a fluidized bed dryer. In addition, if the dextrin used has a high DE value, the resulting product may sometimes develop the sweetness originated from the dextrin in proportion to the added amount thereof.

Patent Document 1: JP-A-Sho 49-25149;
Patent Document 2: JP-A-Sho 54-86648;
Patent Document 3: JP-A-2002-218934;
Patent Document 4: JP-A-Hei 11-346699;
Patent Document 5: JP-A-2003-189811;
Patent Document 6: JP-A-Hei 9-234010;
Patent Document 7: WO 2003/22069.

DISCLOSURE OF THE INVENTION

Problem That the Invention is to Solve

It is an object of the present invention to provide a soybean mixed powder product which makes use of soybean powder obtained by pulverizing dried soybeans and which permits the preparation of a solidified soybean food having a high nutritive value and good appearance and free of any rough and unpleasant feeling to the teeth and which likewise permits the easy preparation of a soybean beverage quite agreeable to the palate at, for instance, each home.

It is also an object of the present invention to provide a premix (or a raw material) used for preparing a solidified soybean food, which can be prepared with the use of soybean powder obtained by pulverizing dried soybeans and which permits the easy preparation of a solidified soybean food having a high nutritive value and good appearance and free of any rough and unpleasant feeling to the teeth at, for instance, each home.

It is a further object of the present invention to provide a premix (or a raw material) used for preparing a soybean beverage having a high nutritive value, good appearance and quite agreeable to the palate, wherein the raw material permits the easy preparation of such a beverage at, for instance, each home.

Means for the Solution of the Problems

The inventors of this invention have tried to blend soybean powder obtained by the pulverization of dried soybeans with dextrin which has long been known as an agglomeration-inhibitory agent to thus achieve the foregoing purposes and to prevent the generation of any agglomerate, in the resulting blend, encountered when adding such soybean powder to water and blending them and have thus succeeded in the reduction of the formation of agglomerates to some extent. However, the generation of agglomerates has not yet been reduced to such a level that the inventors have desire. Thus, the inventors have further continued the investigation, but the effect of reducing the agglomerate-formation has not yet been arrived at such a level that the inventors have desired.

When the inventors have conducted studies for the development a powdery product used for forming TOFU while making use of soybean powder prepared by the pulverization of dried soybeans and magnesium carbonate, as a separate theme, the inventors have unexpectedly found that if a mixture of the foregoing soybean powder, magnesium carbonate and dextrin is blended with water and then the mixture is heated with stirring, almost no agglomerate is formed. The inventors have further continued the foregoing studies on the basis of this finding and have thus completed the present invention.

Accordingly, the following inventions will be provided according to the present invention:

(1) Soybean mixed powder comprising soybean powder prepared by the pulverization of dried soybeans, dextrin and an alkali carbonate.

(2) The soybean mixed powder as set forth in the foregoing item (1), which contains dextrin in an amount ranging from 9 to 40 parts by mass per 100 parts by mass of the soybean powder.

(3) The soybean mixed powder as set forth in the foregoing item (1), wherein the DE value of the dextrin ranges from 7 to 9.

(4) The soybean mixed powder as set forth in the foregoing item (1), which contains the alkali carbonate in a rate ranging from 0.15 to 1.6 parts by mass per 100 parts by mass of the soybean powder.

(5) The soybean mixed powder as set forth in the foregoing item (1), wherein the alkali carbonate is magnesium carbonate.

(6) A premix used for preparing a solidified soybean food comprising soybean mixed powder as set forth in any one of the foregoing items (1) to (5) and a coagulating agent.

(7) The premix used for preparing a solidified soybean food as set forth in the foregoing item (6), wherein the premix used for preparing a solidified soybean food is a premix for forming TOFU or a premix for preparing TOFA.

(8) A packaged premix used for preparing a solidified soybean food comprising a packaged soybean mixed powder obtained by accommodating, in a package, soybean mixed powder which comprises soybean powder prepared by the pulverization of dried soybeans, dextrin and an alkali carbonate; and a packaged coagulating agent prepared by accommodating a coagulating agent in a package, wherein the packaged soybean mixed powder and the packaged coagulating agent are accommodated in a container.

(9) A raw material for forming a soybean beverage comprising the soybean mixed powder as set forth in any one of the foregoing items (1) to (5).

Effects of the Invention

When adding, to water, the soybean mixed powder which comprises soybean powder prepared by finely pulverizing soybeans, dextrin and an alkali carbonate, the mixed powder can easily be dissolved in water without being accompanied by the formation of any agglomerate although the mixed powder contains dietary fibers (so-called OKARA component).

Accordingly, the TOFU, TOFA and soybean beverage, prepared using the foregoing soybean mixed powder, are free of any rough feeling to the tongue, like the conventional TOFU, TOFA and soybean beverages prepared using soybean milk free of any OKARA and likewise free of any bitter and pucker taste and the resulting these products have good taste and texture.

Moreover, the use of soybeans free of any lipoxygenase activity would permit the preparation of and the tasting of the soybean-derived foods and beverages which are free of any smelling of raw or unripe material peculiar to soybeans and which are quite nice and tasty.

BEST MODE FOR CARRYING OUT THE INVENTION

First of all, the kinds of soybeans used in the present invention are not particularly restricted to specific ones, but preferably used herein include those free of any bitter and pucker taste such as the kinds of TOYOMUSUME and OSODE NO MAI and more preferably used herein include lipoxygenase-deficient soybeans. More specifically, the use of the foregoing lipoxygenase-deficient soybeans would permit the preparation of TOFU, TOFA and soybean beverages free of any smelling of raw or unripe material and having excellent taste and texture.

In addition, it is preferred in the present invention to use dried soybeans which are dried to a moisture content of preferably not higher than 10% by mass and more preferably not higher than 5% by mass. This would be preferred since it is easy to prepare soybean powder having a small particle size through the pulverization of such dried soybeans. When producing the foregoing dried soybeans, the soybeans are desirably dried under such a condition that the temperature is not less than 70° C. and preferably 50 to 60° C. so as to prevent the occurrence of any thermal denaturation of the proteins present in the soybeans. If the proteins present in the soybeans are thermally denatured, it would be difficult to solidify the resulting soybean mixed powder even when a coagulating agent is incorporated into the same and this in turn makes, quite difficult, the preparation of a solidified soybean food.

The soybean powder used in the present invention can be produced by the pulverization of the foregoing dried soybeans, but the soybean powder may be one prepared by pulverizing soybeans without removing the husks thereof or husk-removed one obtained by pulverizing soybeans free of their husks, but preferably used herein is husk-free soybean powder since the latter may be able to provide a solidified soybean food (such as TOFU and TOFA) as well as a soybean-derived beverage which are agreeable to the taste and which are free of any bitter and pucker taste. Moreover, when it is intended to produce a good which makes the most use of, for instance, the black husks such as those of black soybeans, the husks thereof must not be removed.

When pulverizing the foregoing dried soybeans, and if it is intended to obtain the aforementioned solidified soybean foods and/or the soybean-derived beverages which are free of any rough and unpleasant feeling, the dried soybeans are preferably pulverized to such an extent that the particle size thereof almost corresponds to that of the higher grade ground tea (for instance, to a median particle size on the order of 5 to 10 µm). In addition, examples of pulverization methods for preparing the soybean powder include those which make use of a mortar- or mill-like pulverization means and a gas flow-assisted pulverization means.

The dextrin used in the present invention is preferably one having a DE value of not higher than 26 and particularly preferably one having a DE value ranging from 7 to 9. In the present invention, the dextrin and an alkali carbonate as will be detailed later are blended with the foregoing soybean powder. In this respect, the simultaneous use of the dextrin and the alkali carbonate as will be described below would provide or show an effect of improving the dispersibility and solubility of the soybean powder when the powder is heated after the addition of water and an effect of preventing the generation of any agglomerate possibly observed when heating the soybean powder after the addition of water. If the dextrin used has a high DE value, however, the resulting soybean powder or a raw material for solidified soybean food would has a sweet taste peculiar to the dextrin. This is not preferred for the solidified soybean food such as TOFU and TOFA, which are ultimately obtained through the processing of the premix for solidified soybean foods and further it is also undesirable for the soybean-derived beverages since the taste peculiar to the soybean would be reduced or impaired. In this connection, the DE value herein used is the abbreviation of "Dextrose Equivalent" and means a numerical value indicating the degree of hydrolysis or an index representing the extent of the saccharification progress and it can be expressed by the following equation: DE=[direct reducing sugar (expressed in terms of glucose)]×100/(solid contents). This value can easily be determined according to the Willstatter-Schuder method.

The content of the dextrin in the soybean mixed powder is not restricted to any particular one inasmuch as the use thereof does not impart any unnatural taste and texture to the solidified soybean food and soybean-derived beverage ultimately prepared, but the content thereof desirably ranges from 9 to 40 parts by mass and more preferably 20 to 30 parts by mass per 100 parts by mass of the soybean powder.

The incorporation of an alkali carbonate into the soybean mixed powder, in combination with the addition of dextrin thereto as has been discussed above, can certainly improve the dispersibility and solubility of the soybean powder in water and likewise effectively prevent the generation of any agglomerate, when heating the soybean powder after the addition of water to thus give a solidified soybean food and soybean-derived beverage, which are excellent not only in the appearance, but also in the pleasantness to the palate. Accordingly, the amount thereof to be added to the soybean mixed powder preferably ranges from 0.15 to 1.6 parts by mass and more preferably 0.45 to 1.1 parts by mass per 100 parts by mass of the soybean powder. As such alkali carbonates, there may be listed, for instance, magnesium carbonate, calcium carbonate and sodium carbonate, but preferably used herein is magnesium carbonate because of its anti-foaming effect during heating the foregoing soybean mixed powder after the addition of water thereto, in addition to the foregoing effect.

A soybean mixed powder product can thus be prepared, which comprises the soybean powder prepared by the pulverization of dried soybeans, dextrin and an alkali carbonate. In this respect, however, it is preferred to prepare the soybean mixed powder in such a manner that the foregoing soybean powder, the dextrin and the alkali carbonate are approximately uniformly dispersed in the resulting mixture. In this connection, it is sufficient that such approximately uniform soybean mixed powder is prepared according to a method such as one in which these components are stirred at a high speed; or one in which these components are stirred over a long period of time. Moreover, an anti-foaming agent and/or an emulsifying agent may be incorporated into the mixed powder as the need arises. Preferably used as such emulsifying agents include, for instance, sucrose fatty acid esters each having a high HLB value. The amount of the sucrose fatty acid ester to be incorporated into the mixed powder is not restricted to any specific one inasmuch as it can improve the releasability of the resulting TOFU, but the amount thereof can be set at a level, for instance, ranging from 0.15 to 1.6% by mass and preferably 0.45 to 1.1% by mass, on the basis of the total mass of the soybean powder used.

The soybean mixed powder of the present invention may be combined with a coagulating agent to thus prepare a raw material (or a premix) used for preparing solidified soybean food. More specifically, the packaged soybean mixed powder obtained by packaging the foregoing soybean mixed powder in a package can, for instance, be accommodated in a container together with a packaged coagulating agent obtained by packaging a coagulating agent into a package to thus put the resulting packaged product on the market as a packaged premix for preparing a solidified soybean food. In this respect, as the package used herein, there may be listed, for instance, a bag for packaging and a box for packaging, but preferably used herein is a bag. Moreover, as the foregoing container, there may be listed, for instance, a bag and a container made of a variety of materials, but preferred are cartons made of paper. In the present invention, specific examples of the solidified soybean food include TOFU and TOFA (also referred to as "TOFU-FA"). In other words, the use of the foregoing raw material used for preparing solidified soybean food according to the present invention would permit the easy preparation of a solidified soybean food such as TOFU or TOFA in place, for instance, at each home. On the other hand, the soybean mixed powder according to the present invention may be formed into a raw material used for preparing a soybean-derived beverage without using any coagulating agent in combination. Accordingly, one can easily prepare a soybean-derived beverage by the addition of water to the raw material in place, for instance at each home and can drink the same.

When preparing a solidified soybean food using the premix used for preparing the same, water is first added to the soybean mixed powder, then heated to dissolve the mixed powder in the water and a coagulating agent is finally added to the resulting mixture to thus solidify the same. As such coagulating agents used for preparing a solidified soybean food, there may be listed, for instance, glucono-δ-lactone, magnesium chloride, calcium chloride, magnesium sulfate and calcium sulfate. These coagulating agents may be used alone or in any combination of at least two of them. Among them, glucono-δ-lactone can preferably be used as the coagulating agent when preparing TOFU as a solidified soybean food, since the resulting TOFU tastes very good. Alternatively, it is also possible to use a mixture of glucono-δ-lactone with brine (bittern) or glucono-δ-lactone which is blended with magnesium chloride, calcium sulfate or magnesium sulfate, in place of the use of glucono-δ-lactone alone. When using glucono-δ-lactone alone, the amount thereof to be used preferably ranges from 3.5 to 5.5 parts by mass per 100 parts by mass of the soybean powder, while if the foregoing mixed coagulating agent is used, the amount of the coagulating agent to be used preferably ranges from 2.0 to 6.0 parts by mass per 100 parts by mass of the soybean powder. In this connection, the kinds of coagulating agents used and the amount thereof may appropriately be adjusted while taking into consideration the intended or favorite taste and texture of the resulting TOFU.

When preparing the raw material used for preparing a solidified soybean food, a proper amount, for instance, that for one person of the soybean mixed powder according to the present invention is packaged in a container such as a bag made of a synthetic resin, followed by optional de-aeration and air-tight sealing, and separately the foregoing coagulating agent is packaged, in an air-tightly sealed condition, in another appropriate container such as a bag made of a synthetic resin in an amount required for solidifying the foregoing soybean mixed powder (for instance, in an amount for one person), after the latter is blended with water and heated, and then these packages are accommodated in a carton made of paper to thus give a packaged raw material used for preparing a solidified soybean food such as a container-packaged raw material for preparing TOFU or a container-packaged raw material for preparing TOFA. In this respect, the quantity of container-packaged raw materials to be accommodated in a carton is not restricted to the quantity for one person, but it may be those for two persons or more persons. Regarding the packaging method, a required number of the foregoing packaged and sealed raw materials for one person may be accommodated in a carton or a bag containing the packaged and sealed raw materials for a plurality of persons may be accommodated in a carton.

The method for preparing TOFU using the packaged raw material for preparing TOFU, in place, for instance at each home is very simple. More specifically, the soybean mixed powder packaged in a packaging bag and the coagulating agent packaged in a separate packaging bag are first withdrawn from the carton. Then the packaging bag containing the soybean mixed powder is opened, the mixed powder is introduced into a pan to which water has been added and they are mixed together using, for instance, a whip to thus dissolve the soybean mixed powder in water. At this stage, it is sufficient to set the amount of the water at a level of about 10 times that of the soybean powder present in the soybean mixed powder. In this connection, however, if it is favorable to prepare softer TOFU, the amount of the water to be added is appropriately increased to a level higher than that specified above, while if it is favorable to prepare rather hard TOFU, the amount of the water to be added is reduced to a level smaller than that specified above.

After the soybean mixed powder is dissolved in water, the pan is put over a fire, the contents thereof was brought to a boil with stirring using a wooden spatula or the like and heated while reducing the heat for 3 to 4 minutes after the boiling thereof. Thereafter, the fire is put out, a coagulating agent is then added, the resulting mixture is immediately stirred to thus uniformly dissolve the same and subsequently the resulting mixture is quickly poured into a container for solidifying YOFU and the container is sealed with, for instance, a sheet of aluminum foil.

Then the container including the mixture can be maintained at room temperature for the solidification of the mixture to thus form TOFU. At this stage, it may be recommended that the resulting TOFU is exposed to water to thus remove the harshness.

Then the raw material used for preparing TOFA as one of the premixes used for preparing solidified soybean foods will be detailed below.

The TOFA has a moisture content higher than that of the TOFU and thus has a softer taste and texture as compared with the TOFU and it is in general eaten like a dessert while putting, for instance, syrup on the same. Accordingly, the raw material used for preparing TOFA is almost identical to the foregoing raw material used for preparing TOFU according to the present invention and the raw material for TOFA can be substituted for the raw material for TOFU in the foregoing description concerning the TOFU.

The method for preparing TOFA using the raw material used for preparing TOFA according to the present invention in place, for instance, at each home is almost identical to that for preparing TOFU using the raw material used for preparing TOFU detailed above. More specifically, the TOFA is eaten while putting, for instance, a various kinds of syrup on the same as has been described above, and accordingly, a required small portion is ladled up from the solidified TOFA as the need arises for the dishing up of the same on a separate container, followed by putting a various kinds of syrup on the TOFA and if necessary the decoration of the TOFA with, for instance, pieces of fruits to thus give a dessert. With respect to the taste and texture of the TOFA when eating the same, if it is favorable to prepare softer TOFA, the amount of the water to be added is appropriately increased, while if it is favorable to prepare rather hard TOFA, the amount of the water to be added is appropriately reduced, as in the case of TOFU. In this respect, however, it is sufficient to set the amount of the water at a level of about 10 times that of the soybean powder present in the soybean mixed powder, as has been described above in connection with TOFU, but the amount of the water to be provided is preferably 16 to 18 times that of the soybean powder.

Next, the raw material used for preparing a soybean beverage which consists of the soybean mixed powder of the present invention will be detailed below.

The method for preparing a soybean beverage using the raw material for soybean beverage is similar to that for the preparation of TOFU as has already been discussed above and comprises the steps of introducing the raw material for soybean beverage into a pan to which water has been added, stirring the mixture with a whip to thus dissolve the raw material for soybean beverage in water. After the dissolution of the raw material for soybean beverage, the pan is put over a fire to thus bring the content thereof to a boil with stirring using a wooden spatula or the like and the content is then maintained in its weakly boiled condition for 3 to 4 minutes. Thereafter, one can taste the resulting mixture while it is still warm or after cooling the same in, for instance a refrigerator and then one can taste it in its cooled condition. Moreover, the resulting product may be seasoned to any favorable taste and texture by the addition of, for instance, sugar or by blending with mashed fruit paste prior to tasting the same. In addition, it is preferred to set the amount of the water at a level of 10 times that of the soybean powder present in the raw material for soybean beverage. In this connection, however, if it is favorable to prepare a concentrated soybean beverage, the amount of the water to be added is appropriately reduced, while if it is favorable to prepare rather a diluted soybean beverage, the amount of the water to be added is appropriately increased.

EXAMPLES

Example 1

Soybeans from which the husks had been removed were finely pulverized using a grinder to thus give soybean powder whose median particle size was about 10 μm (as determined using laser-diffraction type particle size distribution-determining device). To 100 g of the resulting soybean powder, there were added 25 g of dextrin having a DE value of 8, and 0.8 g of magnesium carbonate and then these ingredients were uniformly blended with stirring to thus give soybean mixed powder.

Then water was added to a pan in an amount of 10 times that of the soybean powder present in the foregoing soybean mixed powder, the foregoing soybean mixed powder was introduced into the pan, the contents of the pan was stirred for 45 seconds using a whip, and the pan was put over a strengthened fire while stirring the contents thereof with a wooden spatula. After the contents of the pan began to boil, the flames were weakened and the contents were cooked for 3 to 4 minutes under such a condition that the force of the fire was reduced. Thereafter, the fire was put off. Immediately after the putting off of the fire, 5 g of glucono-δ-lactone was added to the contents of the pan and the contents were poured into a container for solidifying TOFU at a stroke while quickly stirring the same. Then the container was sealed with a sheet of aluminum foil, followed by allowing the contents of the container to stand for about one hour under such conditions to thus give TOFU. The resulting TOFU was withdrawn from the container for solidifying TOFU, then exposed to water for 20 to 30 minutes and the product was then subjected to the sensory evaluation.

Example 2

Water in an amount of 10 times that of the soybean powder present in the foregoing soybean powder was added to a pan, the foregoing soybean mixed powder was introduced into the pan, and the pan was heated in the same manner used in Example 1 to thus form a heated soybean solution. The heated soybean liquid was cooled, 350 mL of the soybean solution was blended with a coagulating agent and the resulting mixture was poured into a TOFU-shaping container made of stainless steel. The coagulating agent used herein was prepared by blending 1 g of glucono-δ-lactone, 2.5 g of brine (a product sold by AKOH KASEI Co., Ltd. Under the trade name of AKOH NO NIGARI, which comprises 32% of magnesium chloride and 5% of magnesium sulfate) and 10 mL of water. The TOFU-shaping container made of stainless steel into which the coagulating agent-containing TOFU solution had been poured was maintained at 80° C. for one hour to thus give TOFU.

Comparative Example 1

Commercially available silk-strained TOFU was used as a comparative sample.

Comparative Example 2

Another comparative sample used herein was TOFU prepared from a raw material for TOFU made of the commercially available soybean milk (TAISHI Food Industry K.K.: Soybean 100 Chilled Soybean Milk (provided with brine)).

The foregoing three kinds of TOFU samples were evaluated and the results are summarized in the following Table 1. The samples were inspected for the taste and texture and evaluated on the basis of the following 5-stage evaluation criteria:
5: Very Good; 4: Good; 3: Mediocre; 2: Bad; 1: Quite Bad.

TABLE 1

| Ex. No. | 1 | 2 | 1* | 2* |
|---|---|---|---|---|
| Taste | 5 | 5 | 5 | 5 |
| Texture | 5 | 5 | 5 | 5 |

*Comparative Example.

The TOFU products prepared in Examples 1 and 2 were only slightly rough to the tongue and/or mouth and showed good taste and texture free of any peculiarity although the TOFU contained fibrous components of soybean. In particular, the TOFU prepared in Example 2 was found to have a highly sweet taste. In addition, it was found that TOFU could quite easily be prepared at home, which had good taste and texture almost comparable to that observed for the commercially available TOFU of Comparative Example 1 and that observed for the TOFU prepared from the raw material therefor which was produced starting from the commercially available soybean milk.

In addition, when comparing the texture of the resulting TOFU with the TOFU prepared in Comparative Example 2 or one prepared from the commercially available soybean milk, the TOFU prepared in Example 1 was found to be in a considerable solidified condition and have firm and reliable texture which was comparable to that observed for the commercially available silk-strained TOFU of Comparative Example 1. Moreover, the TOFU prepared in Example 2 was found to be uniformly solidified and was found to be smooth silk-strained TOFU.

Example 3

In this Example, the effects of dextrin and/or magnesium carbonate on the resulting TOFU were examined and evaluated.

First of all, the quantity of agglomerates formed when preparing TOFU using the soybean mixed powder was determined by the following method. Soybean powder, dextrin and magnesium carbonate identical to those used in Example 1 were prepared and there were prepared samples of soybean mixed powder each containing the foregoing components in a mixing ratio specified in the following Table 2. Then water in an amount of 10 times that of the foregoing soybean powder was added to a pan, the foregoing soybean mixed powder was introduced into the pan, the contents of the pan was stirred for 45 seconds using a whip, and put over a strengthened fire while stirring the same with a wooden spatula. After the contents of the pan began to boil, the flames were weakened and the contents were cooked for 3 to 4 minutes under such a condition that the force of the fire was reduced. Immediately after the fire was put off, the heated soybean solution was passed through a mesh of 1.0 mm, and the solid mater remaining on the mesh was defined to be agglomerates and the amount thereof was determined.

Then, the taste and texture of TOFU were evaluated according to the following method: As described above, water in an amount of 10 times that of the foregoing soybean powder was added to a pan, the ingredients were introduced into the pan according to the composition specified in Table 2, the contents of the pan was stirred for 45 seconds using a whip, and put over a strengthened fire while stirring the same with a wooden spatula. After the contents of the pan began to boil, the flames were weakened and the contents were cooked for 3 to 4 minutes under such a condition that the force of the fire was reduced. Immediately after the fire was put off, 2.3 g of glucono-δ-lactone was added to the contents of the pan and the contents were poured into a container for solidifying TOFU at a stroke while quickly stirring the same. Then the container was sealed with a sheet of aluminum foil, followed by allowing the contents of the container to stand for about one hour under such conditions to thus solidify the contents of the container. The resulting TOFU was then exposed to water for 20 to 30 minutes. Thereafter, the product was then inspected for the taste and texture. The taste and texture were evaluated on the basis of the same 5-stage evaluation criteria used in Example 1.

TABLE 2

| Ex. No. | 3 | 3* | 4* | 5* |
|---|---|---|---|---|
| Soybean Powder (g) | 50 | 50 | 50 | 50 |
| Dextrin (g) | 13 | — | — | 13 |
| Magnesium Carbonate (g) | 0.4 | — | 0.4 | — |
| Amt. of Agglomerates formed during dissolution (g) | 0.14 | 15.8 | 5.6 | 4.3 |
| Taste of TOFU | 5 | 2 | 3 | 4 |
| Texture of TOFU | 5 | 1 | 2 | 4 |

*Comparative Example.

As will be clear from the data listed in Table 2, the sample of Comparative Example 3 free of any dextrin and magnesium carbonate included the highest amount of agglomerates. The formation of agglomerates is slightly suppressed in the sample of Comparative Example 4 or 5 which comprised either dextrin or magnesium carbonate, while dextrin and magnesium carbonate are found to be able to synergistically control the formation of agglomerates in the sample of Example 3 in which these two components are used in combination. In addition, with respect to the taste and texture of TOFU, if agglomerates are formed, the amount of the soybean powder is reduced in proportion to the amount of agglomerates formed and as a result, the resulting TOFU has taste and texture different from those peculiar to the TOFU due to the delicate change in the balance between the amount of the soybean powder and that of the coagulating agent. Furthermore, the agglomerates thus formed would be precipitated at the bottom and this accordingly leads to the formation of TOFU which is not preferred not only from the viewpoint of the appearance, but also from the viewpoint of the pleasantness to the mouth and taste.

Examples 4 to 7

In these Examples, the effect of a change in the amount of dextrin on the quality of the resulting TOFU was evaluated according to the following method. Soybean mixed powder samples each having the composition specified in the following Table 3 were prepared, while using dextrin having a DE value of 9. The amount of glucono-δ-lactone used for the preparation of TOFU was set at a level of 6.9 g and other procedures used for the preparation of TOFU, the method for the determination of the amount of agglomerates formed, and the method for the evaluation of TOFU products used herein were the same as those used in Example 2. The results thus obtained are summarized in the following Tables 3.

TABLE 3

| Ex. No. | 4 | 5 | 6 | 7 |
|---|---|---|---|---|
| Soybean Powder (g) | 150 | 150 | 150 | 150 |
| Dextrin (g) | 13.5 | 30 | 37.5 | 60 |
| Magnesium Carbonate (g) | 1.2 | 1.2 | 1.2 | 1.2 |
| Amt. of Agglomerates formed during dissolution (g) | 1.75 | 0.55 | 0.05 | 0.05 |
| Taste of TOFU | 5 | 5 | 5 | 3 |
| Texture of TOFU | 4 | 5 | 5 | 5 |

As indicated by the data listed in Table 3, the amount of agglomerates formed is gradually decreased as the amount of dextrin increases. On the other hand, the taste and texture of the resulting TOFU are liable to be impaired as the amount of dextrin increases. This would probably be resulted from the effect of the sweetness of dextrin.

Examples 8 to 12

Figure 1:
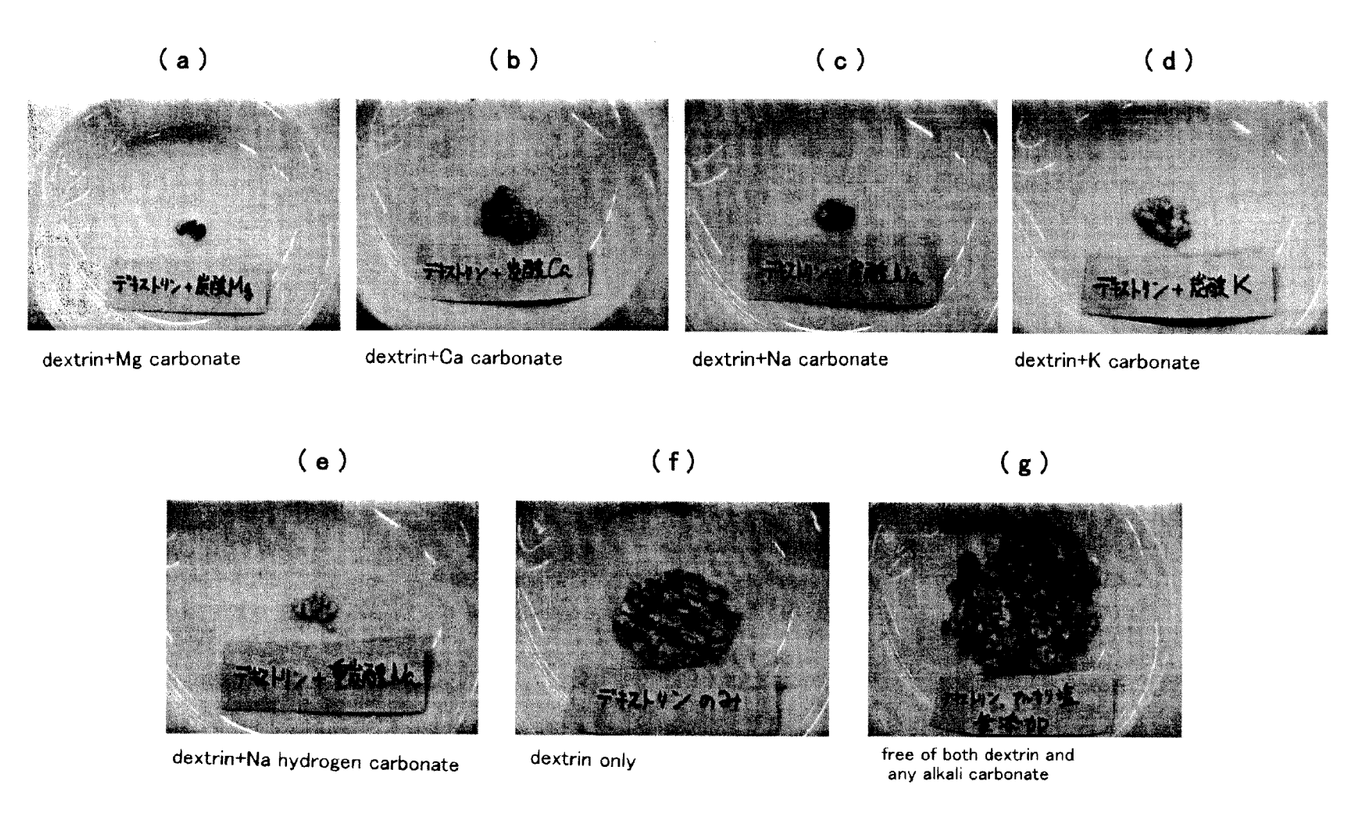
FIG. 1 shows photographs illustrating the amounts of agglomerates formed during the dissolution of the soybean mixed powder samples prepared in Examples 8 to 12 and Comparative Examples 6 and 7 and used in the preparation of TOFU. In this figure, the photograph (a) indicates that the amount of agglomerates formed is equal to 0.18 g relative to 65 g of the soybean powder prepared in Example 7 (dextrin+ magnesium carbonate); the photograph (b) indicates that the amount of agglomerates formed is equal to 1.69 g relative to 65 g of the soybean powder prepared in Example 8 (dextrin+ calcium carbonate); the photograph (c) indicates that the amount of agglomerates formed is equal to 0.43 g relative to 65 g of the soybean powder prepared in Example 9 (dextrin+ sodium carbonate); the photograph (d) indicates that the amount of agglomerates formed is equal to 1.12 g relative to 65 g of the soybean powder prepared in Example 10 (dextrin+ potassium carbonate); the photograph (e) indicates that the amount of agglomerates formed is equal to 0.36 g relative to 65 g of the soybean powder prepared in Example 11 (dextrin+ sodium hydrogen carbonate); the photograph (f) indicates that the amount of agglomerates formed is equal to 5.60 g relative to 65 g of the soybean powder prepared in Comparative Example 6 (containing only dextrin and free of any alkali carbonate); and the photograph (g) indicates that the amount of agglomerates formed is equal to 20.5 g relative to 65 g of the soybean powder prepared in Comparative Example 7 (free of both dextrin and any alkali carbonate).

In these Examples, the effect of the difference in the kinds of alkali carbonates used on the quality of the resulting TOFU was evaluated according to the following method. Soybean mixed powder samples each having the composition specified in the following Table 4 were prepared, while using dextrin having a DE value of 7. The amount of glucono-δ-lactone used for the preparation of TOFU was set at a level of 6.0 g and other procedures used for preparing TOFU, and the method for determining the amount of agglomerates formed, which were used in these Examples were the same as those used in Example 2. The results thus obtained are summarized in the following Tables 4 and photographs of the resulting TOFU are shown in FIG. 1.

TABLE 4

| Ex. No. | 8 | 9 | 10 | 11 | 12 | 6* | 7* |
|---|---|---|---|---|---|---|---|
| Soybean Powder (g) | 65 | 65 | 65 | 65 | 65 | 65 | 65 |
| Dextrin (g) | 16 | 16 | 16 | 16 | 16 | 16 | — |
| Magnesium Carbonate (g) | 0.5 | — | — | — | — | — | — |
| Calcium Carbonate (g) | — | 0.5 | — | — | — | — | — |
| Sodium Carbonate (g) | — | — | 0.5 | — | — | — | — |
| Potassium Carbonate (g) | — | — | — | 0.5 | — | — | — |
| Sodium Hydrogen carbonate (g) | — | — | — | — | 0.5 | — | — |
| Amt. of Agglomerates formed during dissolution (g) | 0.18 | 1.69 | 0.43 | 1.12 | 0.36 | 5.6 | 20.5 |

*Comparative Example.

As will be clear from the results listed and shown in Table 4 and FIG. 1, when adding an alkali carbonate such as those listed above, the amount of agglomerates formed in the resulting TOFU was found to be reduced as compared with that observed for TOFU free of any alkali carbonate.

Among the alkali carbonates, magnesium carbonate, sodium carbonate and sodium hydrogen carbonate were found to have the highest effect of inhibiting the formation of agglomerates, but the use of sodium carbonate and sodium hydrogen carbonate was liable to be accompanied by the generation of fine foams on the surface of TOFU when preparing TOFU and the use thereof is liable to result in, for instance, the formation of softer TOFU. Accordingly, the most excellent alkali carbonate is magnesium carbonate, while collectively taking into consideration the results of the evaluation of the agglomerate formation-inhibitory effect, anti-foaming ability and the quality of the resulting TOFU.

Examples 13 to 16

In these Examples, the effect of the difference in the amount of magnesium carbonate on the quality of the resulting TOFU was evaluated, according to the following method. Soybean mixed powder samples each having the composition specified in the following Table 5 were prepared, while using dextrin having a DE value of 8. The amount of glucono-δ-lactone used for the preparation of TOFU was set at a level of 4.6 g and other procedures used for preparing TOFU, the method for determining the amount of agglomerates formed and the method for evaluating the resulting TOFU, which were used in these Examples were the same as those used in Example 2. The results thus obtained are summarized in the following Tables 5.

TABLE 5

| Ex. No. | 13 | 14 | 15 | 16 |
|---|---|---|---|---|
| Amt. of Soybean Powder (g) | 100 | 100 | 100 | 100 |
| Dextrin (g) | 25 | 25 | 25 | 25 |
| Magnesium Carbonate (g) | 0.15 | 0.45 | 0.8 | 1.6 |
| Amt. of Agglomerates formed during dissolution (g) | 1.55 | 0.51 | 0.35 | 1.58 |
| Taste of TOFU | 5 | 5 | 5 | 5 |
| Texture of TOFU | 4 | 5 | 5 | 4 |

The results listed in the foregoing Table 5 clearly indicate that the amount of agglomerates formed decreases as the amount of magnesium carbonate used increases, but if the amount thereof is too high, there is instead observed such a tendency that the amount of agglomerates formed increases.

Example 17

The same procedures used in Example 1 were repeated to thus form a soybean mixed powder sample having a composition identical to that of the sample prepared in Example 1, then water was added to a pan in an amount of 18 times that of the soybean powder present in the resulting soybean mixed powder, the foregoing soybean mixed powder was introduced into the pan, the contents of the pan was stirred for 45 seconds using a whip, and the pan was put over a strengthened fire while stirring the contents thereof with a wooden spatula. After the contents of the pan began to boil, the flames were weakened and the contents were cooked for 3 to 4 minutes under such a condition that the force of the fire was reduced. Immediately after the putting off of the fire, 5 g of glucono-δ-lactone was added to the contents of the pan and the contents were poured into a container at a stroke while quickly stirring the same. Then the container was sealed with a sheet of aluminum foil, followed by allowing the contents of the container to stand at room temperature for 30 minutes to thus give TOFA.

When black molasses-containing syrup was sprayed on the TOFA prepared above, there was thus prepared delicious TOFA having quite smooth taste and texture and completely free of any rough and unpleasant feeling.

Example 18

The same procedures used in Example 1 were repeated to thus form a raw material used for preparing soybean-derived beverage having a composition identical to that of the sample prepared in Example 1, then water was added to a pan in an amount of 10 times that of the soybean powder present in the resulting raw material for soybean-derived beverage, the foregoing raw material for soybean-derived beverage was introduced into the pan, the contents of the pan was stirred for 45 seconds using a whip, and the pan was put over a strengthened fire while stirring the contents thereof with a wooden spatula. After the contents of the pan began to boil, the flames were weakened and the contents were cooked for 3 to 4 minutes under such a condition that the force of the fire was reduced. The resulting soybean liquid thus heated was cooled in a refrigerator to thus give a soybean-derived beverage.

The resulting soybean beverage was inspected for the taste and texture and the pleasantness to the tongue and evaluated according to the following 5-stage evaluation criteria, while using the commercially available soybean milk (TAISHI Food Industry K.K.: Soybean 100 Chilled Soybean Milk) as a sample of Comparative Example 8:
5: Very Good; 4: Good; 3: Mediocre; 2: Bad; 1: Quite Bad.

TABLE 6

| Ex. No. | 18 | 8* |
|---|---|---|
| Taste | 5 | 5 |
| Pleasantness to the Tongue | 5 | 5 |

*Comparative Example

Industrial Applicability

The soybean mixed powder of the present invention as well as the raw material used for preparing soybean-solidified foods prepared using the soybean mixed powder and the packaged raw material used for preparing soybean-solidified foods and the packaged raw material used for preparing soybean-derived beverages, each of which is packaged in a container, as has been discussed above can be stored over a long period of time and accordingly, they would permit the preparation of TOFU, TOFA and soybean-derived beverages in any out-of-door place, for instance, a campground insofar as any heating means is present at that place and one can eat fresh or newly made TOFU, TOFA and soybean-derived beverages even at such a place. Therefore, the present invention would permit the considerable expansion of the fields of applications of these foods and beverages.

What is claimed is:

1. A method of preparing tofu or tofa, said method comprising:
   (a) mixing, in powder form, a soybean powder prepared by a pulverization of dried soybeans, dextrin in an amount ranging from 20 parts to 40 parts by mass per 100 parts by mass of the said soybean powder, and magnesium carbonate in an amount ranging from 0.45 parts to 0.8 parts by mass per 100 parts by mass of the said soybean powder to form a soybean mixed powder;
   (b) adding the soybean mixed powder to water;
   (c) stirring the soybean mixed powder and water to dissolve the powder in the water to form a first solution;
   (d) heating the first solution of (c) with stirring;
   (e) stopping the heating;
   (f) adding a coagulating agent to the heated solution of (e) with mixing to uniformly dissolve the coagulating agent therein to form a second solution; and,
   (g) allowing the second solution of (f) to stand and coagulate.

2. The method as set forth in claim 1, wherein a Dextrose Equivalent value of the dextrin ranges from 7 to 9.

3. The method as set forth in claim 1, wherein the coagulating agent is glucono-δ-lactone.

4. The method as set forth in claim 3, wherein glucono-δ-lactone is used in an amount ranging from 3.5 parts by mass to 5.5 parts by mass per 100 parts by mass of the soybean powder.

5. The method as set forth in claim 1, further comprising:
   prior to adding the soybean mixed powder to water, accommodating the soybean mixed powder in a first package in a container; and
   prior to adding the coagulating agent to the heated solution of (e), accommodating the coagulating agent in a second package in the container together with the first package.

6. The method as set forth in claim 5, wherein the container is a carton made of paper.

7. The method as set forth in claim 1, wherein an amount of agglomerates formed during dissolution of the soybean mixed powder in the water is 0.7 parts or less by mass per 100 parts by mass of the soybean powder.

8. A method of preparing tofu or tofa, said method comprising:
   (a) mixing, in powder form, a soybean powder prepared by a pulverization of dried soybeans, dextrin powder in an amount ranging from 20 parts to 40 parts by mass per 100 parts by mass of the said soybean powder, and an alkali carbonate powder selected from the group consisting of magnesium carbonate powder, sodium carbonate powder, and sodium hydrogen carbonate powder in an amount ranging from 0.45 parts to 1.1 parts by mass per 100 parts by mass of the said soybean powder to form a soybean mixed powder;
   (b) adding the soybean mixed powder to water;
   (c) stirring the soybean mixed powder and water to dissolve the powder in the water to form a first solution;
   (d) heating the first solution of (c) with stirring;
   (e) stopping the heating;
   (f) adding a coagulating agent to the heated solution of (e) with mixing to uniformly dissolve the coagulating agent therein to form a second solution; and,
   (g) allowing the second solution of (f) to stand and coagulate.

9. The method as set forth in claim 8, wherein the alkali carbonate powder is present in an amount ranging from 0.45 parts to 0.8 parts by mass per 100 parts by mass of the said soybean powder.

10. The method as set forth in claim 8, wherein the alkali carbonate powder is magnesium carbonate powder.

11. The method as set forth in claim 10, wherein the magnesium carbonate powder is present in an amount ranging from 0.45 parts to 0.8 parts by mass per 100 parts by mass of the said soybean powder.

* * * * *